US009059868B2

(12) United States Patent
Hernandez et al.

(10) Patent No.: US 9,059,868 B2
(45) Date of Patent: Jun. 16, 2015

(54) SYSTEM AND METHOD FOR ASSOCIATING VLANS WITH VIRTUAL SWITCH PORTS

(75) Inventors: Hendrich M. Hernandez, Round Rock, TX (US); Gaurav Chawla, Austin, TX (US); Rabah S. Hamdi, Spring, TX (US); Robert L. Winter, Leander, TX (US)

(73) Assignee: Dell Products, LP, Round Rock, TX (US)

( * ) Notice: Subject to any disclaimer, the term of this patent is extended or adjusted under 35 U.S.C. 154(b) by 81 days.

(21) Appl. No.: 13/536,016

(22) Filed: Jun. 28, 2012

(65) Prior Publication Data

US 2014/0003442 A1  Jan. 2, 2014

(51) Int. Cl.
*H04L 12/46* (2006.01)
*H04L 12/931* (2013.01)

(52) U.S. Cl.
CPC ........ *H04L 12/4641* (2013.01); *H04L 12/4645* (2013.01); *H04L 12/467* (2013.01); *H04L 49/70* (2013.01); *H04L 49/35* (2013.01)

(58) Field of Classification Search
CPC ............ H04L 12/4641; H04L 12/4645; H04L 49/201; H04L 49/70; H04L 12/2876; H04L 12/462; H04L 12/4658; H04L 12/4679; H04L 12/66; H04L 41/0806; H04L 49/205; H04L 12/4625; H04L 12/4633; H04L 45/00; H04L 49/35; H04L 12/467
USPC ............................ 370/254–350; 709/201–213
See application file for complete search history.

(56) References Cited

U.S. PATENT DOCUMENTS

| | | | |
|---|---|---|---|
| 6,473,867 B2 | 10/2002 | Yamamoto et al. | |
| 6,567,403 B1 | 5/2003 | Congdon et al. | |
| 7,076,606 B2 | 7/2006 | Orsley | |
| 7,340,672 B2 | 3/2008 | Goldschmidt et al. | |
| 7,783,716 B2 | 8/2010 | Hayward | |
| 8,223,745 B2* | 7/2012 | Johnsen et al. | 370/351 |
| 8,594,082 B2* | 11/2013 | Kamble et al. | 370/388 |
| 2005/0152284 A1 | 7/2005 | Kotha et al. | |
| 2006/0112219 A1 | 5/2006 | Chawla et al. | |
| 2007/0266110 A1 | 11/2007 | Chawla et al. | |
| 2008/0040376 A1 | 2/2008 | Reeves et al. | |
| 2008/0288664 A1 | 11/2008 | Pettey et al. | |
| 2009/0049160 A1 | 2/2009 | Cherian et al. | |
| 2009/0112877 A1 | 4/2009 | Cherian et al. | |
| 2009/0144463 A1 | 6/2009 | Cherian et al. | |
| 2009/0164769 A1 | 6/2009 | Cherian et al. | |
| 2009/0165097 A1 | 6/2009 | Cherian et al. | |
| 2009/0204757 A1 | 8/2009 | Edwards, III et al. | |
| 2009/0232137 A1 | 9/2009 | Cherian et al. | |
| 2009/0327675 A1 | 12/2009 | Cherian et al. | |
| 2010/0049876 A1* | 2/2010 | Pope et al. | 709/250 |
| 2010/0057908 A1 | 3/2010 | Smith et al. | |
| 2010/0077066 A1 | 3/2010 | Chawla et al. | |
| 2010/0138642 A1 | 6/2010 | Cherian et al. | |
| 2020/0146039 | 6/2010 | Lo et al. | |
| 2010/0165877 A1 | 7/2010 | Shulka et al. | |
| 2010/0180274 A1 | 7/2010 | Cherian et al. | |

(Continued)

*Primary Examiner* — Ayaz Sheikh
*Assistant Examiner* — Debebe Asefa
(74) *Attorney, Agent, or Firm* — Larson Newman, LLP

(57) ABSTRACT

A network switch includes a virtual local area network module that determines that a device coupled to a first switch port includes a virtual network interface. The module further identifies a virtual switch port partitioned in the first switch port associated with the virtual network interface and determines that a virtual local area network is associated with the identified virtual switch port.

16 Claims, 6 Drawing Sheets

(56) References Cited

U.S. PATENT DOCUMENTS

| | | | |
|---|---|---|---|
| 2010/0275199 A1* | 10/2010 | Smith et al. | 718/1 |
| 2011/0085560 A1 | 4/2011 | Chawla et al. | |
| 2011/0103259 A1 | 5/2011 | Aybay et al. | |
| 2011/0173441 A1 | 7/2011 | Bagepalli et al. | |
| 2011/0202701 A1 | 8/2011 | Maitra | |
| 2012/0042095 A1 | 2/2012 | Kotha et al. | |

* cited by examiner

SYSTEM AND METHOD FOR ASSOCIATING VLANS WITH VIRTUAL SWITCH PORTS

FIELD OF THE DISCLOSURE

The present disclosure generally relates to information handling systems, and more particularly relates to system and method for associating virtual local area networks (VLANs) with a virtual switch port.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
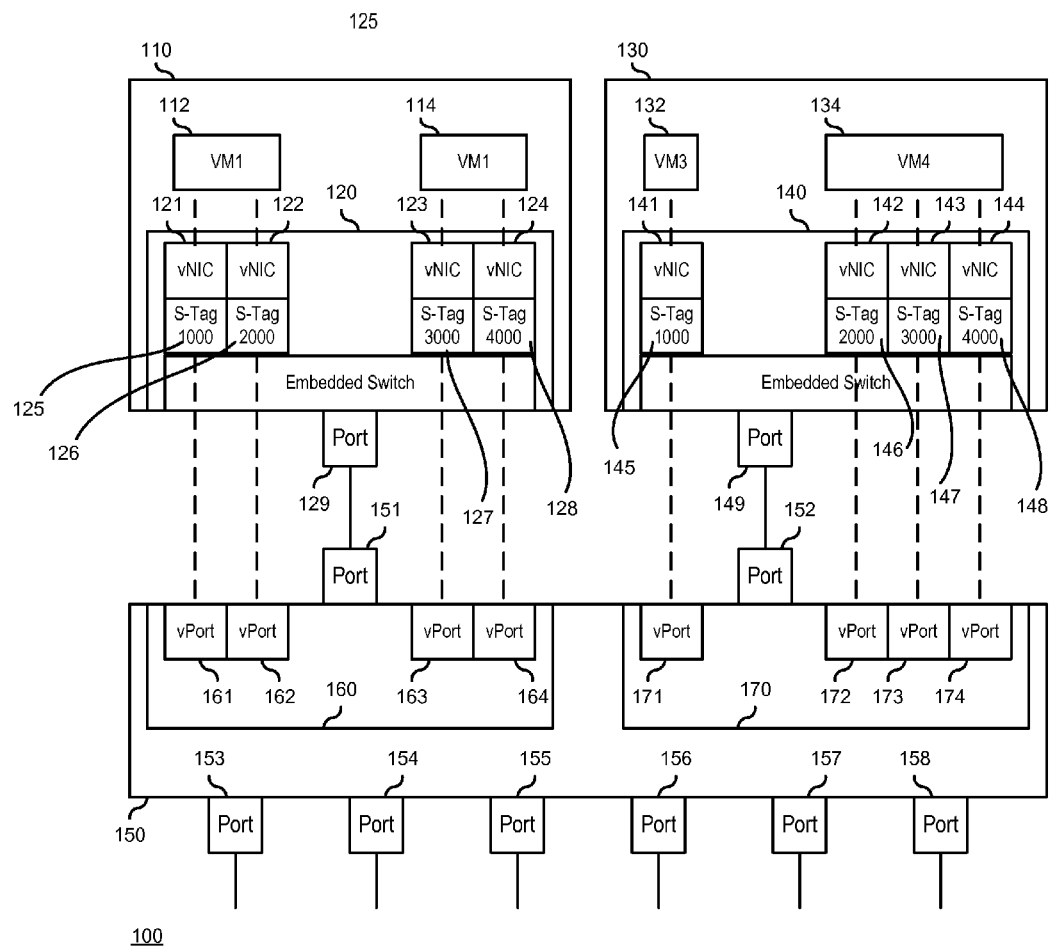
FIG. 1 is a block diagram of a switched environment according to an embodiment of the present disclosure.

FIG. 1 illustrates a switched environment 100 that can include one or more information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

In a particular embodiment, switched environment 100 includes a server 110, one or more additional servers 130, and a network switch 150. Server 110 represents an information handling system such as a stand-alone server, a rack mounted server, a blade server, or another type of information handling system. Server 110 includes a virtualization capable operating system, such as a virtual machine manager, that launches a virtual machine 112, and one or more additional virtual machines 114 on the hardware of the server. A wide variety of software applications may similarly operate on server 110. Server 110 also includes a network interface device 120. Network interface device 120 represents a hardware device of server 110, such as a network interface card (NIC), a converged network adapter (CNA), or another type of network device, that operates to connect the server to other devices. Other examples of a network interface device 120 include an Ethernet adapter, a Fibrechannel network device, a SCSI adapter, or another type of network interface device. In the illustrated embodiment, network interface device 120 is capable of providing one or more virtual network interfaces or vNICs that are associated with virtual machines launched by the virtualization capable operating system, in order to partition the network traffic on a physical port 129. For example, network interface device 120 can provide a 100 gigabit Ethernet (GbE) channel on port 129 that can be partitioned into a number of virtual channels of various bandwidths, and that are allocated to virtual machines 112 and 114, as needed or desired. As such, network interface device 120 includes vNICs 121 and 122 that are associated with virtual machine 112, and vNICs 123 and 124 that are associated with virtual machine 114. For example, vNICs 121 and 122 can be configured as 10 GbE partitions, thereby allocating 20 Gb of the 100 Gb bandwidth of physical port 129 to the virtual machine. In another example, vNIC 123 can be configured as a 10 GbE partition, and vNIC 124 can be configured as a 1 GbE partition. Here, network traffic on vNIC 124 can be reserved for low bandwidth applications, such as a printer or other such low bandwidth devices.

Each vNIC 121-124 has associated with it a source tag or S-tag value 125, 126, 127, and 128 that is identified for that virtual network interface or vNIC. The S-tag is predefined and pre-configured for each vNIC. The vNICs 121 through 124 are also each identified as a network location address by a unique address identifier, such as a Media Access Control (MAC) address, a World Wide Name (WWN), or another unique identifier. Physical server port 129 provides for communication between vNICs 121 through 124, and other devices that are connected to port 129 as needed or desired. Physical server port 129 is also identified by a unique identifier, such as a MAC address or a WWN, and includes an embedded switch that operates as a switch for traffic between virtual machines 112 and 114. As such, traffic between virtual machines 112 and 114 remains on server 110, and does not add to the network traffic bandwidth on port 129. In another embodiment, the virtualization capable operating system provides the virtual network interfaces that are associated with virtual machines 112 and 114, and includes a virtual switch that operates similarly to an embedded switch.

Server 130 is similar to server 110, including a virtualization capable operating system that launches virtual machines 132 and 134, and a network interface device 140 similar to network interface device 120, and that connects the server to other devices. Network interface device 140 provides vNIC 141 that is associated with virtual machine 132, and vNICs 142, 143, and 144 that are associated with virtual machine 134. Any combination of vNIC and virtual machine or other application in servers 110 and 130 is possible. Each vNIC 141-144 has associated with it an S-tag value 145, 146, 147, and 148 that is identified for that virtual network interface or vNIC. The S-tag is predefined and pre-configured for each vNIC. The vNICs 141 through 144 are also each identified as a network location address by a unique address identifier, such as a Media Access Control (MAC) address, a World Wide Name (WWN), or another unique identifier. Network interface device 140 also includes a physical port 149 similar to physical port 129, and an embedded switch.

Network switch 150 includes physical switch ports 151 through 158. Physical switch port 151 is connected to physical server port 129, and physical switch port 152 is connected to physical server port 149. Physical switch ports 153 through 158 are connected to various downlink devices including other servers, network switches, storage devices, local area networks (LANs), other computing devices, or a combination thereof. Network switch 150 also includes port virtualization modules 160 and 170 that provide for the virtualization of the associated physical ports 151 and 152, respectively, such that the physical switch ports support virtual communication channels. As such, port virtualization module 160 includes virtual switch ports (vPorts) 161 through 164, and port virtualization module 170 includes vPorts 171 through 174. vPorts 161 through 164 are associated with vNICs 121 through 124, respectively, and vPorts 171 through 174 are associated with vNICs 141 through 144, respectively, such that network traffic that has the unique identifier for vNIC 121 as its destination address is routed over a virtual channel to vPort 161, and so on. Within the network switch 150, each vPort is assigned a unique virtual switch port identifier. Each vPort is associated with servicing one vNIC across a virtual channel between servers 110 and 130 and network switch 150. The S-tag of a vNIC and the physical port on which data is received provides mapping from the vPort to the server 110 at the appropriate vNIC. This ultimately provides mapping to the virtual machine or other application operating on server 110. An example of network switch 150 includes an Ethernet switch, a Fibrechannel switch, a SCSI switch, or another type of switch. Network switch 150 may include a combination of one or more switch types.

Network switch 150 may also operate to provide link aggregation groups (LAGs) between physical switch ports. In a particular embodiment (not illustrated), two or more physical switch ports of network switch 150 can be connected to two or more network interface devices of a common server. The two or more physical switch ports can form a LAG. Here downstream network traffic that is received from the server, that is, from either one of the two or more physical switch ports, is routed to a third physical switch port, and upstream network traffic that is received from a downstream device on the third physical switch port is routed to the server via an available one of the two or more physical ports in the LAG. In this way, network traffic from the server appears to the downstream devices as a single server endpoint. The LAG provides redundancy and added throughput where needed. LAGs may be formed, for example, according to IEEE Link Aggregation Control Protocol for Ethernet or similar protocols for other communication types such as Fibrechannel, SCSI, eSATA, IDE, Firewire, and USB, etc.

In a particular embodiment, one or more of servers 110 and 130 include one or more additional network interface devices similar to network interface devices 120 and 140. In this case, the multiple network interface devices can be partitioned into vNICs as needed or desired to allocate the network traffic bandwidth of the multiple network interface devices. Moreover, vNICs from two or more different network interface devices can be associated with the same virtual machine. As such, network switch 150 also operates to provide vPorts that are associated with different physical switch ports, and that may include multiple vNICs that may even be associated with a common virtual machine.

Figure 2:
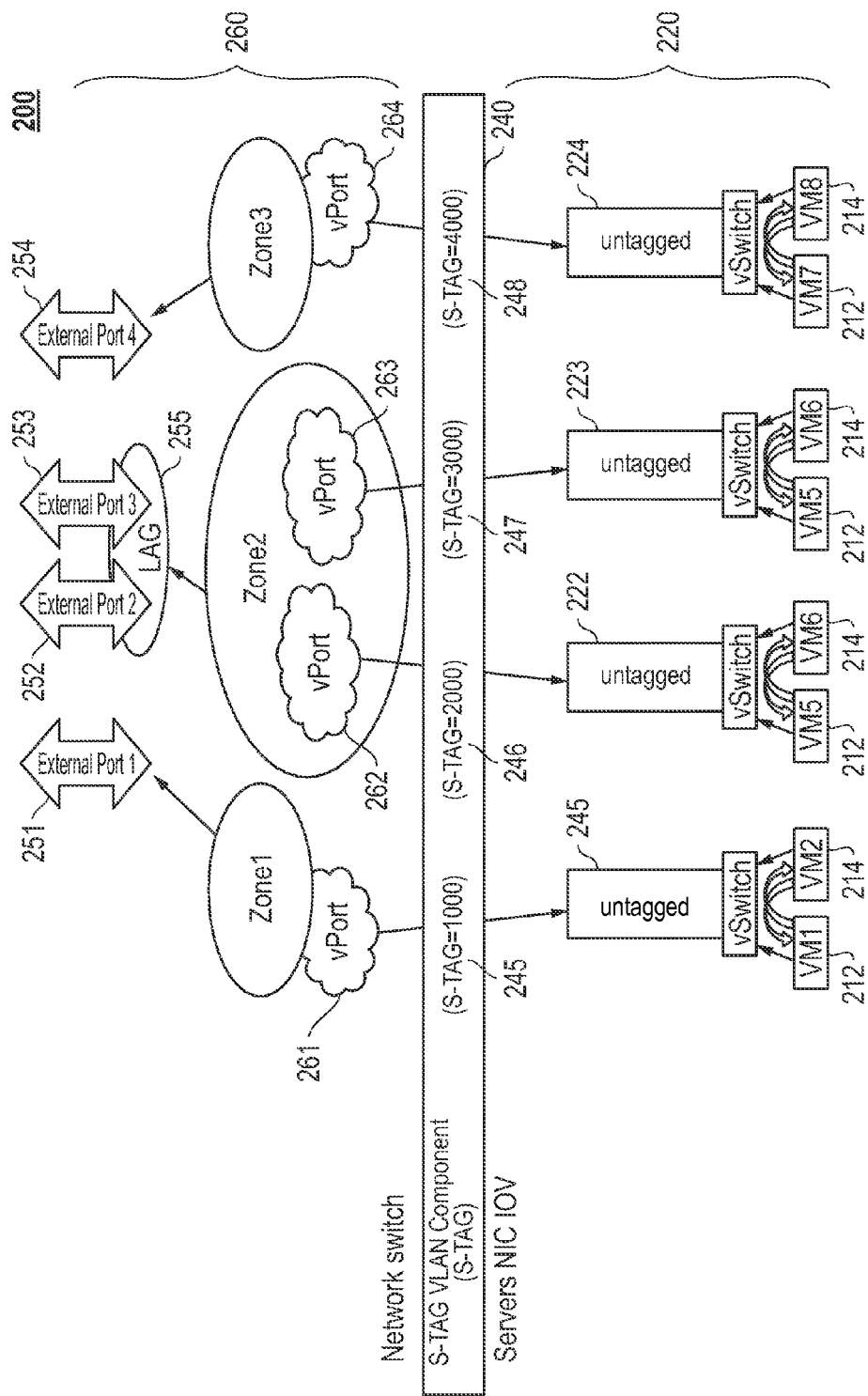
FIG. 2 is a block diagram of another switched environment according to an embodiment of the present disclosure.

FIG. 2 illustrates a switched environment 200 similar to switched environment 100, including a partitioned NIC (vNIC) layer 220, a mapping layer 240, and a network switch layer 260. Partitioned NIC layer 220 may include one or more vNICs; for example vNICs 221, 222, 223 and 224 as shown. The physical NICs on the server or servers in partitioned NIC layer 220 may be partitioned into the vNICs 221-224 shown in the example embodiment. The vNICs 221-224 shown in FIG. 2 may be associated with one server or may be associated with multiple servers in any combination. Any variety of partitioning of the physical NICs is contemplated. For example, NIC partitioning may be according to NIC Partitioning 2.0 protocols. Each vNIC may be associated with one or more virtual machine applications (VM) 212 and 214. In an embodiment, the vNIC may also have a virtualized switch permitting switching between VMs 212 and 214 without data reaching the network switch layer 260.

Mapping layer 240 assigns an S-tag to each vNIC 221-224. In the shown embodiment, S-tag value 245 is assigned to vNIC 221, S-tag value 246 is assigned to vNIC 222, S-tag value 247 is assigned to vNIC 223, and S-tag value 248 is assigned to vNIC 224. Each vNIC 221-224 communicates with a virtual switch port (vPort) in network switch layer 260 via a virtual channel. The physical ports on the network switch may be partitioned into vPorts 261-264 as shown in network switch layer 260. The vPorts are associated with the vNICs. In the example embodiment, vNIC 221 communicates with vPort 261, vNIC 222 communicates with vPort 262, vNIC 223 communicates with vPort 263, and vNIC 224 communicates with vPort 264. Data communicated by the each vNIC is "untagged" meaning it can only belong to a single VLAN for a given vPort. The S-tag values link the vNICs to vPorts in the network switch layer 260. The S-tag values may pre-fixed with the vNICs at the partitioned NIC layer 220. They are default values which identify each vNIC partition. In certain embodiments, or for certain reconfigurations, that the S-tag values may be changed as needed. However, by leaving the S-tag values fixed, any VLAN configuration may then take place at the network switch layer 260.

The switch recognizes the vNIC partitions via the physical switch port identification and the S-tag. Each physical switch port receiving data frames from the vNIC partitions at a device connected to the network switch has a physical switch port identifier. A physical switch port identifier and the S-tag associate the data with a corresponding vPort. This establishes a physical trunk between the vNIC at the sending device and the network switch at the vPort. In this way, multiple vNICs may be configured as "untagged" access VLANs if tagged with an S-tag. The vPort is associated with one VLAN. For example, S-tag 1000 tagged to an Ethernet packet at 245 and received at Zone 1 indicates data that has arrived from vNIC 221 via vPort 261. The network switch cross-references the S-tag value and the physical port on which the data is received in a table indicating a unique vPort identification value. This vPort identification value is then cross-referenced by the network switch with a table indicating the VLAN associated with that vPort identification value. Each network switch vPort can be a member of one untagged VLAN. Since there are multiple vPorts per physical switch port serving multiple vNICs, the server can be a member of multiple VLANs simultaneously. The VLANs are configured such that the network switch vPort is a member of each VLAN. Mapping data from the vPort to the vNIC is accomplished via the vNIC destination MAC address and the S-tag value. In the example shown, the network switch is able to transmit and receive data from the VLAN associated with vPort 261 via an external port 250. Upon identifying the correct VLAN for the vPort 261, the network switch attaches a VLAN tag (Q-tag) to the data frame. Then the network switch routes the data along the correct uplink to the VLAN according to the destination address.

One physical NIC for a server may be a member of more than one VLAN under this disclosed embodiment. However multiple VLAN configurations at the server are unnecessary. The multiple VLAN configurations reside in the network switch layer 260. Each VLAN tag needs only be configured at the switch for the vPort that communicates with the VLAN. In one embodiment, a vPort may only be a member of one VLAN. Configuration at the network switch layer 260 provides efficiency by relieving a server or device administrator from having to configure multiple customer VLANs at each server or device location. There may also be multiple servers each communicating with multiple VLANs through the network switch. Each server or device administrator may only need to enable the S-tag mode. The VLAN configurations, and reconfigurations, may take place only within the network switch layer 260. In an example embodiment discussed further below, this may be via a VLAN module in the network switch. The configuration of multiple VLANs on a server or device supporting multiple vNIC partitions is avoided. The configuration of multiple VLANs may occur at the network switch where hardware queue elements for each switch vPort with ingress and egress pipelining and filtering are defined. In this way, membership access of the vPort may be defined with respect to the VLAN. The VLAN tag may therefore also be defined at the switch and not at the servers or devices attached to the switch by way of vNICs. Additionally configuring the VLANs on a per vPort VLAN definition at the switch may be simpler than configuring on a per MAC address basis.

Also, as shown in FIG. 2, network switch layer 260 includes external ports 252 and 253 that are connected as a link aggregation group (LAG) 255. This LAG 255 communicates to one or more vPorts 262 and 263 forming Zone 2 as shown. Thus, LAG 255 may be associated with S-tag values 246 or 247 via vPorts 262 and 263 according one embodiment of the present disclosure. LAG 255 may appear as one link to vPorts 262 and 263.

Figure 3:
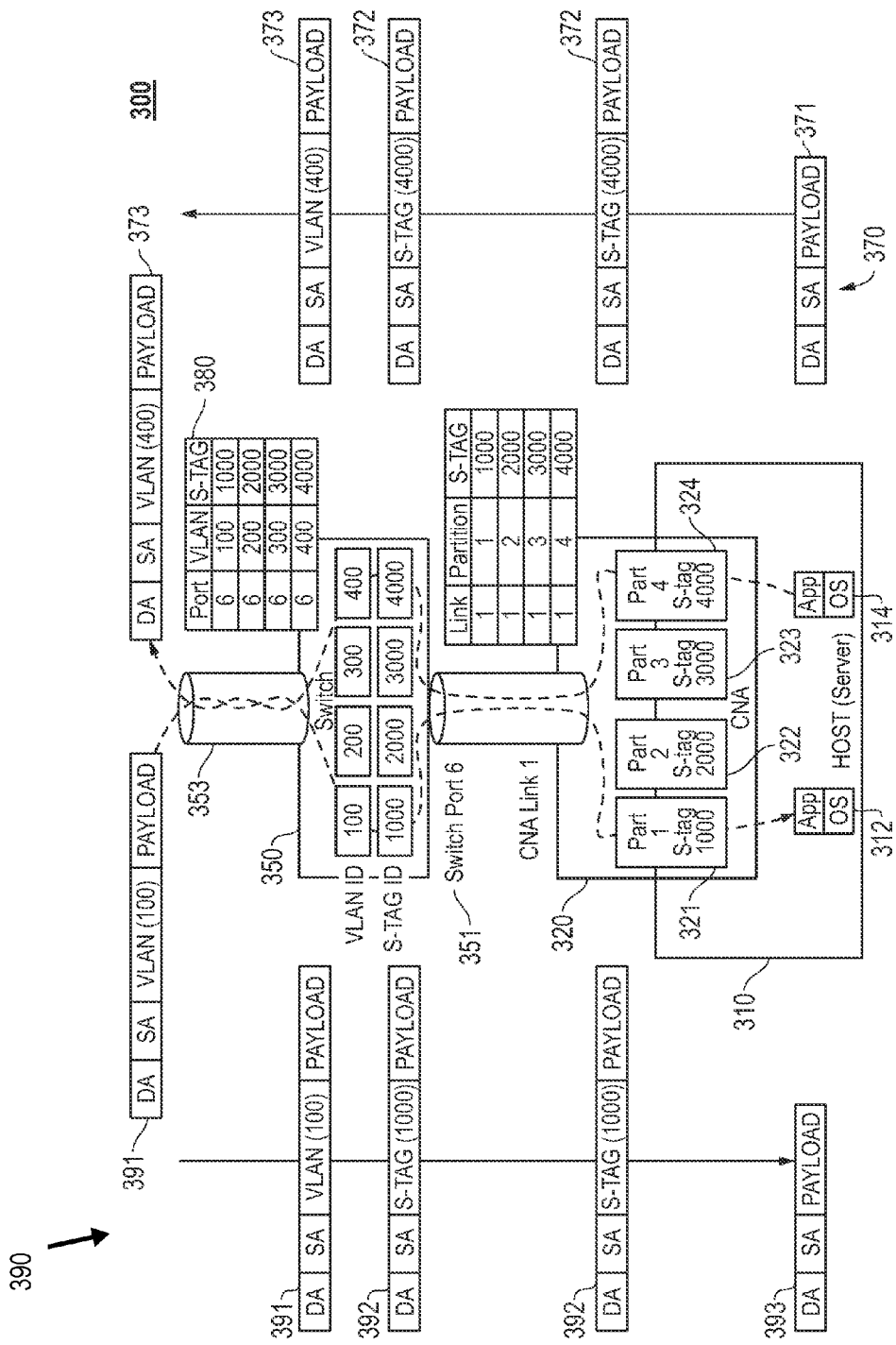
FIG. 3 is a block diagram of another switched environment and data frame flow according to an embodiment of the present disclosure.

FIG. 3 illustrates a switched environment 300 similar to switched environment 100, including a host server 310 with virtual machine applications or other software applications 312 and 314. The network interface 320 is a converged network adapter (CNA) in this example embodiment. CNA 320 is partitioned into four virtual NICs 321-324. Partitioned NIC 1 321 is identified with an S-tag of 1000. Partitioned NIC 2 322 is identified with an S-tag of 2000. Partitioned NIC 3 323 is identified with an S-tag of 3000. Partitioned NIC 4 324 is identified with an S-tag 4000. Each of the vNICs 321-324 is connected to network switch 350 through CNA link 1 and switch port 6 at 351. Network switch 350 has one or more external ports 353 to communicate uplinked data to external networks including external VLANs. FIG. 3 shows the inbound and outbound packet frame flows from virtual machine applications 312 and 314 to associated VLANs external to the network switch 350.

The operation of switched environment 300 can be understood with respect to packet flows from virtual machine 314 to the devices connected downstream from network switch 350. An example packet frame flow with frame modifications is shown at 370. In an exemplary embodiment, virtual machine 314 executes an application that elects to communicate data to a device on a LAN connected to external switch port 353. The destination device is part of a VLAN. In response, an Ethernet packet frame 371 is generated including the Ethernet data payload, destination address (DA), and a source address (SA). The Ethernet packet is sent to the physical network interface device (CNA) 350. Network interface device 350 represents a NIC, a CNA, or another type of network device that operates to connect the server 310 to the other devices. The network interface device may be partitioned into one or more virtual partitions 321, 322, 323 and 324. For discussion of FIG. 3, the partitions are also referred to as vNICs. The virtual machine application 314 sends the data packet frame to a vNIC partition 324 of network interface device 320. The selection of the correct vNIC partition 324 is based on the sub-networks established for communication and the VLANs dedicated to that communication. These sub-networks may be selected on a destination address basis or may be selected based upon the type of network communication. For example, if the destination IP-address for the Ethernet packet is part of a subnet, then the server 310 may communicate with the NIC partition (vNIC) 324. Alternatively, vNIC 324 may be selected based on the type of communication taking place, for example, Ethernet, SCSI, Fibrechannel, eSATA, IDE, Firewire, or USB, etc.

The partition vNIC 324 has been pre-assigned an S-tag value 4000. S-tag 4000 is inserted in the frame header of the packet frame 372. Packet frame 372 is sent via CNA link 1 to the physical switch port 351, shown in the example as switch port 6. Upon receipt of the packet frame 372, the switch 350 determines the physical switch port on which the data packet frame was received and the S-tag value in the frame. The switch cross-references a table 380 to determine membership in VLAN 400. This is done by associating the S-tag value and physical port information with a virtual switch port (not shown) at the network switch 350. Each virtual switch port has a unique virtual switch port identifier. By determining the virtual switch port identifier on which the data is received, the switch can determine membership of the virtual switch port identifier in the correct VLAN. This process links the vNIC having the predefined S-tag with the appropriate VLAN for communication. The VLAN sessions permit secure communications between the application and a VLAN partner in another device that is connected to a port 353 of network switch 350. Configuration of the VLAN may be now be conducted only at the switch 350. The vNIC 324 may send the Ethernet frame to the vPort with the S-tag but without attaching a VLAN Q-tag. In this way, the vNIC may operate as though the VLAN it is communicating with allows "untagged" access. A VLAN module (not shown) in the network switch determines which configured virtual switch ports have membership in the VLAN. The VLAN module is discussed further below in reference to FIGS. 4 and 5. The vNICs at the server 310 need not be configured with the VLAN, thus saving time and effort during configuration of multiple VLANs. Only the switch administration software needs to be configured to be part of the VLAN. For example, the network switch VLAN module administers configuring VLANs. Additionally, the physical network interface device 320 at a server 310 with several vNIC partitions 321, 322, 323 and 324, may be a member of multiple VLANs via the virtual switch ports or vPorts.

The S-tag of Ethernet packet frame 372 is removed by the switch and a VLAN-tag is inserted in the header at 373. In this example, VLAN 400 tag is inserted into the data packet header. Then using the destination address and the VLAN information, the appropriate uplink port 353 is selected to send the data packet frame 373. Physical port 353 sends the packet to the destination device on the VLAN.

The receive direction 390 of a packet frame and delivery to a server application is shown. A device on VLAN 100 provides a packet with the VLAN tag header information 391 to switch 350 via switch port 353. The switch 350 determines the virtual switch port associated with that VLAN tag value using the destination MAC address and the VLAN tag. Then switch 350 determines the S-tag value associated with the virtual switch port by cross referencing table 380. The switch 350 removes the VLAN tag and inserts the S-tag into the packet frame header at 392. Then the packet frame is forwarded to the virtual switch port on the downlink port 351. The virtual switch port connects to the correct partitioned vNIC 321 associated with the received S-tag value. At the network interface device 320, the S-tag is removed from the data packet frame at 393 and the data packet payload is forwarded to the destination virtual machine 312.

Figure 4:
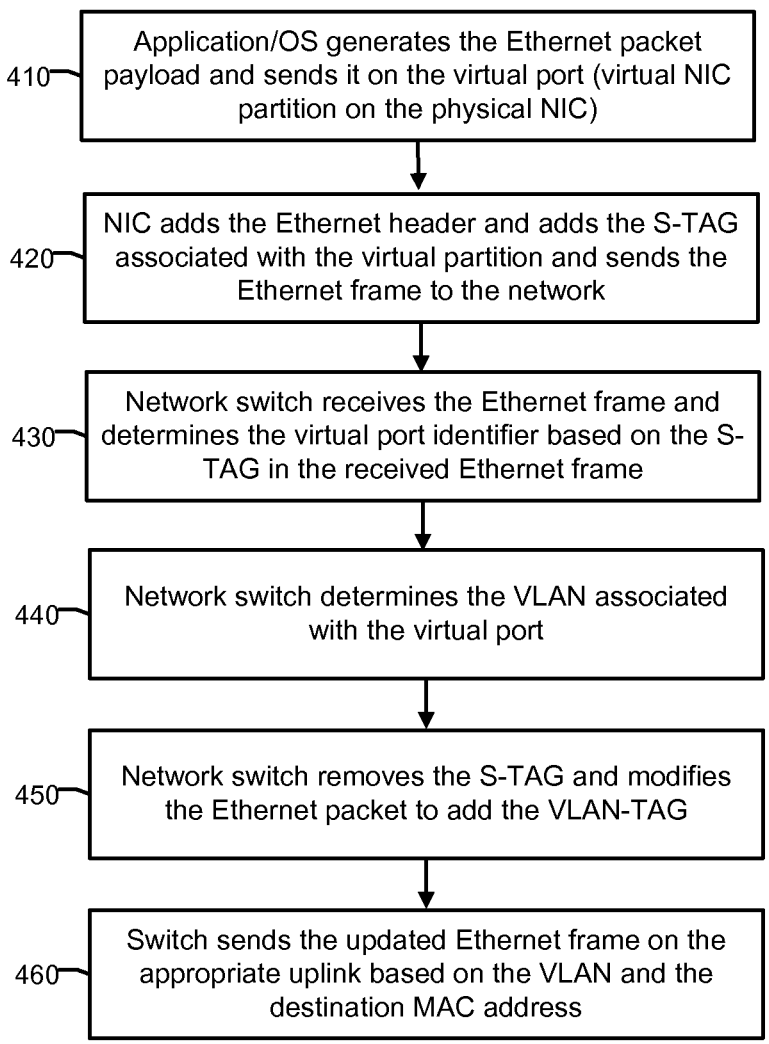
FIG. 4 is a flowchart illustrating a method of data transmission flow according to an embodiment of the present disclosure.

FIG. 4 illustrates a method of transmission flow of an Ethernet packet from an application at a server to a destination via a VLAN. The method of this embodiment associates a server vNIC with a VLAN at a network switch using an S-tag. The association of the vNIC and the VLAN occurs at a network switch. The method starts at block 410 where a packet data payload is created and sent to a server vNIC. For example, an application, such as a virtual machine application running on the server, may generate an Ethernet packet payload that it needs to deliver to a device located elsewhere on a VLAN. The application delivers the Ethernet packet payload to a vNIC on a server. The physical NIC port of the server may be partitioned into multiple virtual NIC ports (vNICs) as described above with reference to FIG. 1. At block 420, the NIC adds the Ethernet header and adds the S-tag data associated with the vNIC to the Ethernet packet frame. Each vNIC maintained by a virtualization module of the server has associated with it an identifying S-tag value for that vNIC that is predefined if the S-tag mode is enabled. The Ethernet frame with S-tag information is sent to the network switch.

At block 430, the network switch receives the Ethernet frame on a physical port at a virtual link corresponding to the vNIC on the server. The network switch virtual link is connected to a partitioned virtual switch port (vPort) associated across a network fabric with the vNIC of the sending server. Each physical switch port may be partitioned into one or more vPorts at the network switch. Once received at the network switch, the network switch accesses a table or other data association to determine the vPort identifier from the S-tag data in the received the Ethernet frame and the physical switch port identifier indicating which physical switch port the Ethernet frame was received on. This may be done via a VLAN module located in the network switch. The VLAN module is a software module of commands executed by a processor at the switch to determine VLAN membership of vPorts. The VLAN module cross references the incoming physical port identifiers and S-tags to determine vPort identifiers. Then the vPort identified may be cross referenced with a VLAN. The vPort identifier is a unique identifier associated with the virtual switch port and may only belong to one access VLAN. Thus, "untagged" Ethernet frame data associated with the vPort identifier can therefore be associated with an access VLAN at the network switch. The VLAN module is also where the per vPort VLAN configuration at the network switch may occur as well. As such it may be part of the port virtualization module described in FIG. 1, or it may be separate.

At block 440, the network switch determines, via another table or data association, the VLAN associated with the unique vPort identifier. In effect, the information from the S-tag, along with the physical switch port identified as receiving the S-tag and data, provides the correct VLAN on which the Ethernet data is to travel.

At block 450, the network switch removes the S-tag from the Ethernet frame and modifies the Ethernet frame by adding a VLAN tag identifying the correct VLAN on which the Ethernet packet is to travel. In one embodiment, this frame modification may be managed by the VLAN module within the network switch.

At block 460, the network switch utilizes link configuration data, link buffers and forwarding databases stored in network switch memory to send the Ethernet frame on the appropriate uplink for the destination MAC address on the VLAN. The Ethernet frame is VLAN-tagged and forwarded to the destination device attached to the VLAN. Other Ethernet switches, routers or network devices may comprise the VLAN path to the destination device.

Figure 5:
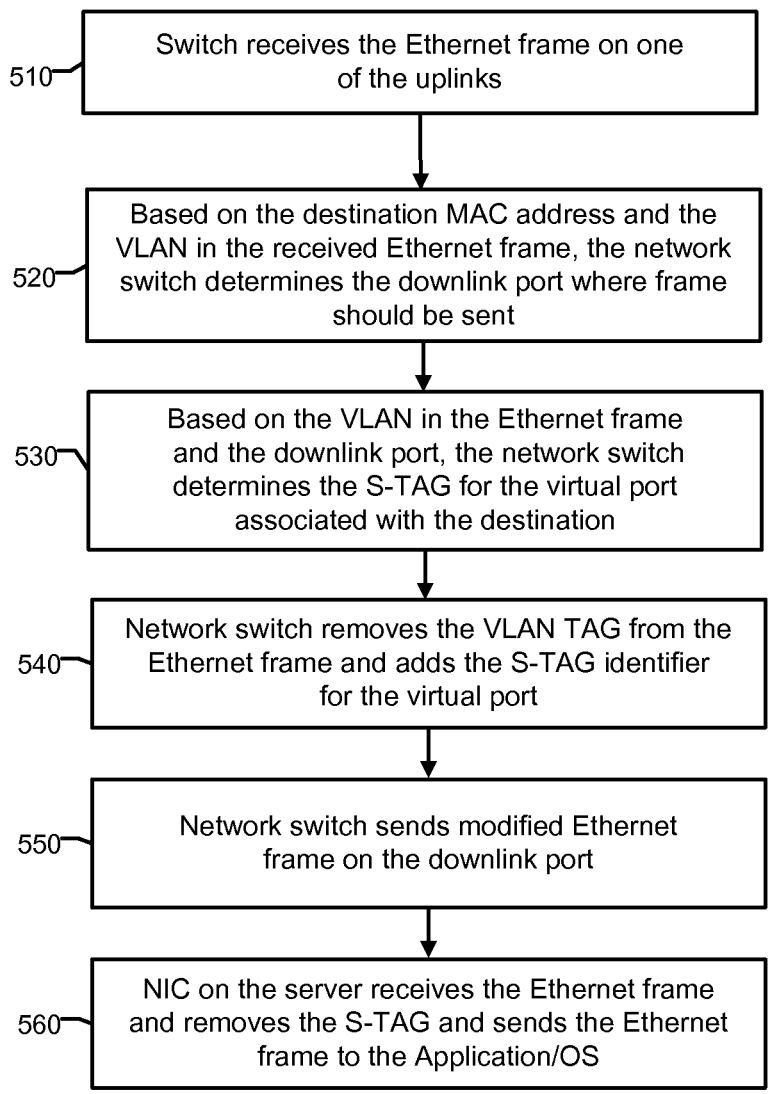
FIG. 5 is a flowchart illustrating a method of data reception flow according to an embodiment of the present disclosure.

FIG. 5 illustrates a method of receiving an Ethernet packet at a destination server flowing from a VLAN. The method of this embodiment associates a destination server's vPort at the network switch with the incoming data packet from the VLAN and assigns an S-tag to map to and deliver the packet to the destination server vNIC. The association of the VLAN and the virtual switch port occurs at a network switch. This may occur at the VLAN module within the network switch. The method starts at block 510 where a network switch receives an Ethernet frame from one of the uplinks connected to the external network having one or more VLANs. At block 520, the network switch detects the MAC address and VLAN tag identification in the received Ethernet packet frame. This may occur via a VLAN module located in the network switch. The network switch uses this data to cross reference with link configuration data and a forwarding database stored at the network switch to determine the downlink physical port of the network switch where the Ethernet frame should be sent.

At block 530, the network switch uses the identified VLAN tag and the downlink physical port identifier to cross-reference the VLAN data base and determine the S-tag for the virtual switch port associated with the destination MAC address. A VLAN module within the network switch may be used to conduct this determination from data bases associating the VLAN tag, virtual port identifier, physical port identifier and S-tags stored in memory at the network switch. Determining the appropriate S-tag may be done by first determining a unique virtual switch port identifier and then associating that virtual switch port identifier with the S-tag to be used with the vNIC at the destination server. In this way the VLAN information and the destination MAC address may be used to provide mapping to the vNIC on the destination server from the vPort without need for a VLAN tag or VLAN configuration at the destination vNIC.

At block 540, the network switch VLAN module modifies the received Ethernet frame. The network switch removes the VLAN tag from the Ethernet frame and adds an S-tag identifier for the destination vNIC. At block 550, the switch sends the modified Ethernet frame on the identified downlink vPort of the network switch. At block 560, the NIC at the destination server receives the incoming Ethernet packet frame at the vNIC. The destination server NIC removes the S-tag and sends the Ethernet payload data to the application that is the intended recipient. The recipient application running on the destination server may be a virtual machine application.

Figure 6:
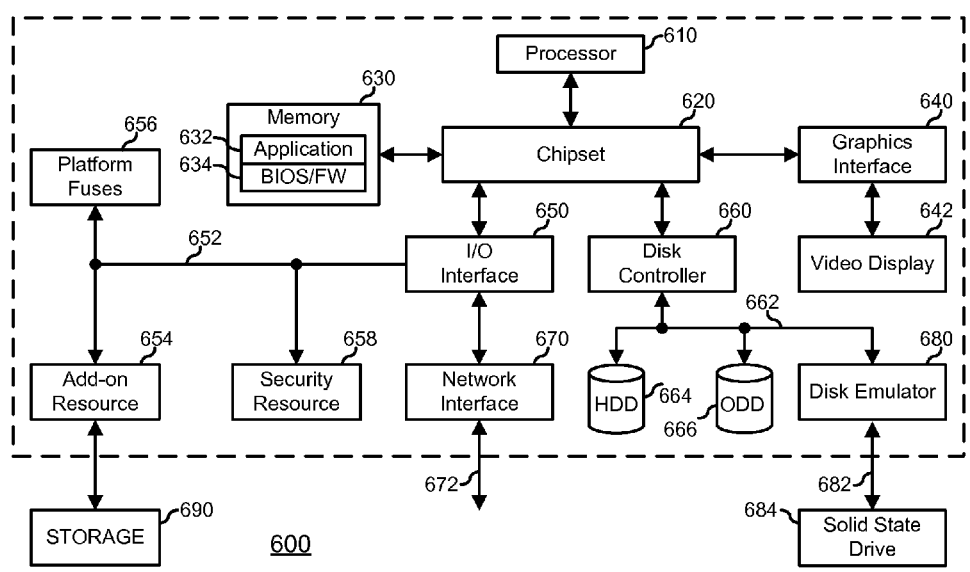
FIG. 6 is a block diagram illustrating an information handling system according to an embodiment of the present disclosure.

FIG. 6 is a block diagram illustrating an embodiment of an information handling system 600, including a processor 610, a chipset 620, a memory 630, a graphics interface 640, an input/output (I/O) interface 650, a disk controller 660, a network interface 670, and a disk emulator 680. In a particular embodiment, information handling system 600 is used to carry out one or more of the methods described herein. In another embodiment, one or more of the systems described herein are implemented in the form of information handling system 600.

Chipset 620 is connected to and supports processor 610, allowing the processor to execute machine-executable code. In a particular embodiment, information handling system 600 includes one or more additional processors, and chipset 620 supports the multiple processors, allowing for simultaneous processing by each of the processors and permitting the exchange of information among the processors and the other elements of the information handling system. Chipset 620 can be connected to processor 610 via a unique channel, or via a bus that shares information among the processor, the chipset, and other elements of information handling system 600.

Memory 630 is connected to chipset 620. Memory 630 and chipset 620 can be connected via a unique channel, or via a bus that shares information among the chipset, the memory, and other elements of information handling system 600. In another embodiment (not illustrated), processor 610 is connected to memory 630 via a unique channel. In another embodiment (not illustrated), information handling system 600 includes separate memory dedicated to each of the one or more additional processors. A non-limiting example of memory 630 includes static random access memory (SRAM), dynamic random access memory (DRAM), non-volatile random access memory (NVRAM), read only memory (ROM), flash memory, another type of memory, or any combination thereof.

Graphics interface 640 is connected to chipset 620. Graphics interface 640 and chipset 620 can be connected via a unique channel, or via a bus that shares information among the chipset, the graphics interface, and other elements of information handling system 600. Graphics interface 640 is connected to a video display 642. Other graphics interfaces (not illustrated) can also be used in addition to graphics interface 640 as needed or desired. Video display 642 includes one or more types of video displays, such as a flat panel display, another type of display device, or any combination thereof.

I/O interface 650 is connected to chipset 620. I/O interface 650 and chipset 620 can be connected via a unique channel, or via a bus that shares information among the chipset, the I/O interface, and other elements of information handling system 600. Other I/O interfaces (not illustrated) can also be used in addition to I/O interface 650 as needed or desired. I/O interface 650 is connected via an I/O interface 652 to one or more add-on resources 654. Add-on resource 654 is connected to a storage system 690, and can also include another data storage system, a graphics interface, a network interface card (NIC), a sound/video processing card, another suitable add-on resource or any combination thereof. I/O interface 650 is also connected via I/O interface 652 to one or more platform fuses 656 and to a security resource 658. Platform fuses 656 function to set or modify the functionality of information handling system 600 in hardware. Security resource 658 provides a secure cryptographic functionality and includes secure storage of cryptographic keys. A non-limiting example of security resource 658 includes a Unified Security Hub (USH), a Trusted Platform Module (TPM), a General Purpose Encryption (GPE) engine, another security resource, or a combination thereof.

Disk controller 660 is connected to chipset 620. Disk controller 660 and chipset 620 can be connected via a unique channel, or via a bus that shares information among the chipset, the disk controller, and other elements of information handling system 600. Other disk controllers (not illustrated) can also be used in addition to disk controller 660 as needed or desired. Disk controller 660 includes a disk interface 662. Disk controller 660 is connected to one or more disk drives via disk interface 662. Such disk drives include a hard disk drive (HDD) 664, and an optical disk drive (ODD) 666, and can include one or more disk drives as needed or desired. ODD 666 can include a Read/Write Compact Disk (R/W-CD), a Read/Write Digital Video Disk (R/W-DVD), a Read/Write mini Digital Video Disk (R/W mini-DVD), another type of optical disk drive, or any combination thereof. Additionally, disk controller 660 is connected to disk emulator 680. Disk emulator 680 permits a solid-state drive 684 to be coupled to information handling system 600 via an external interface 682. External interface 682 can include industry standard busses such as USB or IEEE 1394 (Firewire) or proprietary busses, or any combination thereof. Alternatively, solid-state drive 684 can be disposed within information handling system 600.

Network interface device 670 is connected to I/O interface 650. Network interface 670 and I/O interface 650 can be coupled via a unique channel, or via a bus that shares information among the I/O interface, the network interface, and other elements of information handling system 600. Other network interfaces (not illustrated) can also be used in addition to network interface 670 as needed or desired. Network interface 670 can be a network interface card (NIC) disposed within information handling system 600, on a main circuit board such as a baseboard, a motherboard, or any combination thereof, integrated onto another component such as chipset 620, in another suitable location, or any combination thereof. Alternatively, network interface 670 can be a converged network adapter (CNA) device. A CNA device may combine the functionality of a NIC with that of a host bus adapter (HBA) servicing network and storage devices connected via SCSI, Fibrechannel, eSATA, IDE, Firewire, and USB connection protocols. Network interface 670 includes a network channel 672 that provide interfaces between information handling system 600 and other devices (not illustrated) that are external to information handling system 600. Network interface 670 can also include additional network channels (not illustrated).

Information handling system 600 includes one or more application programs 632, and Basic Input/Output System and Firmware (BIOS/FW) code 634. BIOS/FW code 634 functions to initialize information handling system 600 on power up, to launch an operating system, and to manage input and output interactions between the operating system and the other elements of information handling system 600. In a particular embodiment, application programs 632 and BIOS/FW code 634 reside in memory 630, and include machine-executable code that is executed by processor 610 to perform various functions of information handling system 600. In another embodiment (not illustrated), application programs and BIOS/FW code reside in another storage medium of information handling system 600. For example, application programs and BIOS/FW code can reside in HDD 664, in a ROM (not illustrated) associated with information handling system 600, in an option-ROM (not illustrated) associated with various devices of information handling system 600, in storage system 690, in a storage system (not illustrated) associated with network channel 672, in another storage medium of information handling system 600, or a combination thereof. Application programs 632 and BIOS/FW code 634 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A network switch, comprising:
a first switch port wherein the first switch port is partitioned into a plurality virtual switch orts and each virtual switch sort belongs to one virtual local area network;
a second switch port; and
a virtual local area network module operable to:
determine from a preconfigured S-tag assigned to a virtual network interface received with a first data frame at the first switch port wherein a host device coupled to the first switch port includes the virtual network interface;
identify a virtual switch port partitioned in the first switch port that is associated with the virtual network interface; and
determine a virtual local area network associated with the identified virtual switch port from the S-tag and the virtual switch port;
remove the S-tag and assign a virtual local area network tag associated with the determined virtual local area network;
wherein the network switch is operable to route the first data frame to the virtual local area network via the second switch port.

2. The network switch of claim 1, wherein further:
the virtual local area network module is operable to:
receive a second data frame;
determine a virtual switch port partitioned in the first switch port from a virtual local area network tag and a destination address on the second data frame received at the second port; and
determine an S-tag assigned to a virtual network interface at a destination host device coupled to the first switch port.

3. The network switch of claim 2, wherein the network switch is operable to route the second data frame to the destination device via the first switch port.

4. The network switch of claim 1, wherein further:
each virtual switch port is associated with one virtual network interface at the host device coupled to the first switch port.

5. The network switch of claim 1, wherein the virtual local area network is configured at the network switch to include the host device and not at the host device coupled to the first switch port.

6. The network switch of claim 1, wherein the virtual local area network is configured at the network switch to include the virtual switch port.

7. The network switch of claim 1, wherein the virtual local area network module is further operable to establish a physical trunk port between the network switch and the virtual network interface at the device coupled to the first switch port.

8. A method of communicating with a virtual local area network, comprising:
receiving a first data frame at a virtual network interface of a physical network interface from an application operating on an information handling system, wherein the physical network interface of the information handling system is partitioned into a plurality of virtual network interfaces and may communicate with a plurality of virtual local area networks;
adding an S-tag preconfigured and assigned to the virtual network interface to the first data frame; and
sending the first data frame to a network switch via the virtual network interface;
wherein the S-tag will indicate to the network switch, along with an identified virtual switch port of the network switch receiving the first data frame, the virtual network interface for association of the data frame with a virtual local area network, and
wherein the virtual network interface communicates with the virtual local area network as if untagged with a VLAN tag.

9. The method of claim 8, further comprising:
receiving a second data frame with an assigned S-tag at the corresponding virtual network interface from the network switch;
removing the S-tag from the second data frame; and
sending the second data frame without the S-tag to the application on the information handling system.

10. The method of claim 8, wherein:
the first data frame is an Ethernet packet data frame.

11. The method of claim 8, wherein the virtual network interface of the information handling system has an S-tag assigned upon initiating an S-tag mode.

12. A method of providing access to a virtual local area network, comprising:
receiving a first data frame containing an S-tag at a network switch, wherein the S-tag is preconfigured and assigned to a virtual network interface of a sending device coupled to the network switch;
determining a virtual switch port of the network switch based on the S-tag;
determining the virtual local area network associated with the virtual switch port;
receiving the first data frame containing an S-tag at the virtual switch port, wherein the virtual switch port is associated with one virtual network interface at the sending device connected to the network switch;
removing the S-tag from the first data frame and adding a virtual local area network tag to update the first data frame; and
sending the updated first data frame to a destination address on a network link to the virtual local area network.

13. The method of claim 12, further comprising:
receiving a second data frame with a virtual local area network tag and a destination address at the network switch;
determining a preconfigured S-tag associated with the virtual local area network tag from the second data frame;
removing the virtual local area network tag from the second data frame and attaching the S-tag associated with the virtual local area network tag to update the second data frame; and
sending the updated second data frame to the destination address with the virtual network interface assigned that S-tag via a virtual switch port on the network switch.

14. The method of claim 12, wherein determining the virtual local area network associated with the S-tag comprises:
determining a virtual switch port identifier from the S-tag and from a physical port identifier of the physical port on which the first data frame is received; and
determining membership of a virtual switch port identified by the virtual switch port identifier in the virtual local area network.

15. The method of claim 12, wherein the virtual local area network associated with the S-tag comprises:
the virtual local area network having a member virtual switch port; and
the member virtual switch port is configured to the virtual local area network at a virtual local area network module in the network switch.

16. The method of claim 13, wherein determining the S-tag associated with the virtual local area network tag from the second data frame comprises:
determining a virtual switch port identifier from the destination address and the virtual local area network tag; and
determining the S-tag from the virtual switch port identifier.

* * * * *